2,704,300

PREPARATION OF AROMATIC CARBINOLS

Ferdinand B. Zienty, Brentwood, and Angelo J. Speziale, Kirkwood, Mo., assignors to Monsanto Chemical Company, St. Louis, Mo., a corporation of Delaware No Drawing. Application December 3, 1953, Serial No. 396,074

6 Claims. (Cl. 260—618)

This invention relates to the preparation of carbinols of the structural formula

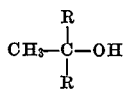

where R is a chlorphenyl radical.

In accordance with this invention it has been found that carbinols of the aforedescribed structural formula can be conveniently prepared in good yields by reacting acetic anhydride with a Grignard reagent of the formula R-MgBr where R is a chlorphenyl radical in a molar ratio of approximately 1:2–3.

As illustrative of this invention is the following—

Example I

To a suitable reaction vessel is added 6 parts by weight of magnesium, 5.9 parts by weight of p-bromochlorobenzene and approximately 58 parts by weight of diethyl ether. The mixture so obtained is heated to reflux. The source of heat is removed, the agitator started and the mass maintained at a temperature of about 34° C. until the reaction subsides. The mixture is heated to reflux and thereto is added 40 parts by weight of p-bromochlorobenzene admixed with 140 parts by weight of diethyl ether over a period of about two hours while constantly refluxing. The mixture is refluxed for an additional one hour and thereto while constantly refluxing 8.2 parts by weight of acetic anhydride admixed with approximately 58 parts by weight of diethyl ether is added over a period of about 3 hours. The mixture is agitated for about one hour at about 34° C., cooled and poured into a mixture containing 40 parts by weight of ammonium chloride, 130 parts by weight of water and 200 parts by weight of cracked ice. The aqueous layer is drawn off and extracted with diethyl ether. The ether extracts are combined, washed with aqueous sodium carbonate, filtered, and the filtrate is subjected to vacuum distillation in the presence of 0.5 part by weight of sodium carbonate. The solid residue upon air-drying is recrystallized from petroleum ether. A yield of 18.3 parts by weight (85% of theory) of crystalline di-(p-chlorophenyl) methyl carbinol is obtained.

Employing the procedure of Example I but replacing acetic anhydride with a chemically equivalent amount of ethyl acetate or acetyl chloride 10–15% lower yields of the desired carbinol are obtained in the form of a semi-liquid product difficult to purify.

Other inert solvents than diethyl ether may be employed in the process of this invention for example di-isopropyl ether, di-butyl ether, N,N-dimethyl aniline and the like. The quantity of inert solvent may also be widely varied, however, it is necessary that the amount employed provide a fluid medium.

The temperature of the reaction may vary widely depending upon the inert solvent employed. In general temperatures in the range of about 25 to 60° C. are preferred.

While this invention has been described with respect to certain embodiments it is not so limited and it is to be understood that variations and modifications thereof obvious to those skilled in the art may be made without departing from the spirit or scope of this invention.

What is claimed is:

1. In the process of making a carbinol of the structural formula

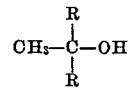

where R is a chlorphenyl radical, the step which comprises reacting in an inert organic solvent at a temperature in the range of about 25° C. to about 60° C. acetic anhydride and a Grignard reagent of the formula R-MgBr, where R is a chlorphenyl radical in a molar ratio of approximately 1:2–3.

2. The process of claim 1 wherein the inert organic solvent is diethyl ether.

3. The process of making a carbinol of the structural formula

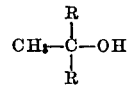

where R is a chlorphenyl radical, which comprises reacting in an inert organic fluid medium at a temperature in the range of about 25° C. to about 60° C. substantially one molecular proportion of acetic anhydride with two to three molecular proportions of a Grignard reagent of the formula R-MgBr, where R is a chlorphenyl radical and hydrolyzing the reaction product so obtained.

4. The process of making a carbinol of the structural formula

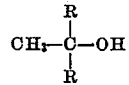

where R is p-chlorphenyl radical, which comprises reacting in a fluid medium at an inert organic temperature in the range of about 25° C. to about 60° C. substantially one molecular proportion of acetic anhydride with two to three molecular proportions of a Grignard reagent of the formula R-MgBr, where R is a p-chlorphenyl radical, and hydrolyzing the reaction product so obtained in the presence of ammonium chloride.

5. The process of making a carbinol of the structural formula

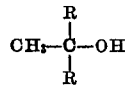

where R is a chlorphenyl radical, which comprises reacting in a dialkyl ether solvent and at a temperature in the range of about 25° C. to about 60° C. substantially one molecular proportion of acetic anhydride with two to three molecular proportions of a Grignard reagent of the formula R-MgBr, where R is a chlorphenyl radical and hydrolyzing the reaction product so obtained.

6. The process of making a carbinol of the structural formula

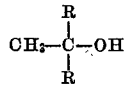

where R is p-chlorphenyl radical, which comprises reacting in diethyl ether at a temperature in the range of about 25° C. to about 60° C. substantially one molecular proportion of acetic anhydride with two to three molecular proportions of a Grignard reagent of the formula R-MgBr, where R is p-chlorphenyl radical, and hydrolyzing the reaction product so obtained in the presence of ammonium chloride.

References Cited in the file of this patent

Newman et al.: Jour. Organic Chemistry, vol. 13 (1948), pages 592—598.